United States Patent [19]
Jelenic et al.

[11] Patent Number: 5,523,360
[45] Date of Patent: Jun. 4, 1996

[54] PROCESS FOR THE MODIFICATION OF POLYPHENYLENE ETHER RESIN COMPOSITIONS IN THE PRESENCE OF A CITRACONIMIDE COMPOUND

[75] Inventors: Jernej Jelenic, Schalkhaar; Auke G. Talma, Bathmen; Peter Hope, Twello, all of Netherlands

[73] Assignee: Akzo Nobel N. V., Netherlands

[21] Appl. No.: 362,480

[22] PCT Filed: Jun. 29, 1993

[86] PCT No.: PCT/EP93/01670

§ 371 Date: Feb. 2, 1995

§ 102(e) Date: Feb. 2, 1995

[87] PCT Pub. No.: WO94/01485

PCT Pub. Date: Jan. 20, 1994

[30] Foreign Application Priority Data

Jul. 1, 1992 [EP] European Pat. Off. ............. 92201967

[51] Int. Cl.[6] ............. C08L 71/12; C08L 77/00
[52] U.S. Cl. ............. 525/397; 525/66; 525/68; 525/133
[58] Field of Search ............. 525/397, 66, 68, 525/133

[56] References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 4,654,405 | 3/1987 | Jalbert et al. | 525/391 |
| 4,771,096 | 9/1988 | Bussink et al. | 525/68 |
| 4,866,114 | 9/1989 | Taubitz et al. | 524/100 |
| 4,957,965 | 9/1990 | Taubitz et al. | 524/66 |
| 5,019,626 | 5/1991 | Taubitz et al. | 525/92 B |
| 5,053,458 | 10/1991 | Taubitz et al. | 525/63 |
| 5,288,812 | 2/1994 | Bussink et al. | 525/92 D |

FOREIGN PATENT DOCUMENTS

| | | | |
|---|---|---|---|
| 0121974 | 10/1984 | European Pat. Off. | C08L 71/04 |
| 0257486 | 3/1988 | European Pat. Off. | C08L 71/04 |
| 3540119 | 5/1987 | Germany | C08F 283/08 |
| 87/00540 | 1/1987 | WIPO | C08G 65/48 |

OTHER PUBLICATIONS

"Radical Copolymerization of N–(4–Substituted phenyl) citraconimide with Stryene or Methyl Methacrylate", Oishi, *Polymer Journal*, vol. 12, No. 11, pp. 799–807 (1980).

"Relationship Between Morphology and Properties of N–6/PPO Polymer Alloy", Chiba, Intl. *Polymer Sci. & Technology*, vol. 16 No. 3, pp. 25–30 (1989).

International Search Report for PCT/EP93/01670 dated Oct. 13, 1993.

"Maleamic and Citraconamic Acids, Methyl Esters, and Imides", Mehta, et al., *Journ. of Organic Chem.*, vol. 25, p. 1012 (1960).

"The Copolymerisation of Maleimide", Paesschen, et al., *Makromol. Chem.*, vol. 27, 112 (1964).

*Primary Examiner*—Thomas Hamilton, III
*Attorney, Agent, or Firm*—Ralph J. Mancini; Louis A. Morris

[57] ABSTRACT

A process for the modification of a polyphenylene ether resin composition is claimed, said process being carried out in a temperature range of between the melting point and the degradation point of said resin composition and in the presence of an effective amount of a citraconimide compound to reduce the melt viscosity of said resin composition, said citraconimide compound being represented by formula (I), wherein X is selected from the group consisting of hydrogen, $C_1$–$C_{18}$ alkyl groups, $C_2$–$C_{18}$ alkenyl groups, $C_2$–$C_{18}$ alkynyl groups, $C_3$–$C_{18}$ cycloalkyl groups, $C_3$–$C_{18}$ cycloalkenyl groups, $C_3$–$C_{18}$ cycloalkynyl groups, $C_6$–$C_{18}$ aryl groups, $C_7$–$C_{30}$ aralkyl groups, $C_7$–$C_{30}$ alkaryl groups, and $C_7$–$C_{30}$ alkenaryl groups, all of which may be linear or branched and unsubstituted or substituted with one or more amino, carboxy, cyano, halogens, esters, oxiranes, ethers, nitro, hydroxy and alkoxy groups. The melt viscosity of the resin compositions is significantly reduced by the process of the present invention. Furthermore, functional groups are introduced in the resin compositions by modifications with a functional group-containing citraconimide compound.

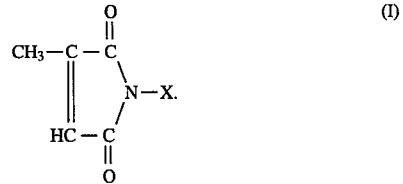

8 Claims, No Drawings

PROCESS FOR THE MODIFICATION OF POLYPHENYLENE ETHER RESIN COMPOSITIONS IN THE PRESENCE OF A CITRACONIMIDE COMPOUND

The present invention relates to a process for the modification of polyphenylene ether resin compositions in the presence of a citraconimide compound, to the use of said citraconimide compound in the modification of said resin composition, to the resin composition modified in accordance with the present process and to articles comprising the modified resin composition. The primary advantage of the process of the present invention is the improvement of the melt-flow properties of the resin compositions.

Polyphenylene ether resins are high performance engineering thermoplastics having relatively high melt viscosities and melting points. They are useful for many commercial applications requiring high temperature resistance and can be formed into films, fibers and molded articles. However, the art has recognized that polyphenylene ether resins have a major drawback. Because of the high melt viscosity and melting point of the resins, they require a high molding temperature and molding pressure. This leads to difficulties in the melt processing. There have been, therefore, attempts to improve the melt-flow properties of these resins, either alone or in compositions.

For example, European patent application EP 0 257 486 discloses the use of maleimides in a process to improve the flow properties of polyphenylene ether resins. European patent application EP 0 121 974 discloses the use of maleimides to suppress the increase of the molecular weight of polyphenylene ether resins under extrusion conditions. The examples in the specification show a decrease in the melt-viscosity of the polyphenylene ether resin, when modified. Also Chiba et al., Int. Pol. Sci. Techn., vol. 16, No. 3, 1989, pp. 25–30, discloses that maleimide influences the melt-flow properties of the PPO. However, according to this publication, maleimide does not undergo a graft reaction with PPO during the melt-mixing process.

According to the present invention there is provided a process for the modification of a polyphenylene ether resin composition, characterized by the step of reacting the polyphenylene ether resin composition at a temperature above the melting point and below the degradation point of said resin composition with an effective amount of a citraconimide compound to reduce significantly the melt viscosity of said resin composition, said citraconimide compound being represented by the formula (I):

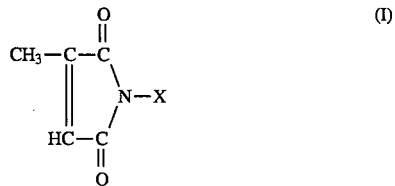

wherein X is selected from the group consisting of hydrogen, $C_1$–$C_{18}$ alkyl groups, $C_2$–$C_{18}$ alkenyl groups, $C_2$–$C_{18}$ alkynyl groups, $C_3$–$C_{18}$ cycloalkyl groups, $C_3$–$C_{18}$ cycloalkenyl groups, $C_3$–$C_{18}$ cycloalkynyl groups, $C_6$–$C_{18}$ aryl groups, $C_7$–$C_{30}$ aralkyl groups, $C_7$–$C_{30}$ alkaryl groups, and $C_7$–$C_{30}$ alkenaryl groups, all of which may be linear or branched and unsubstituted or substituted with one or more amino, carboxy, cyano, halogens, esters, oxiranes, ethers, nitro, hydroxy and alkoxy groups. The use of said citraconimide compounds results in an improvement of the melt-flow properties of modified polyphenylene ether resin compositions when compared with unmodified polyphenylene ether resin compositions and polyphenylene ether resin compositions modified with the modifiers known in the art.

A second advantage of the modification process of the present invention is the introduction of functional groups in polyphenylene ether resin compositions by modification with a functional group-containing citraconimide compound.

U.S. Pat. No. 4,654,405 discloses the carboxylation of polyphenylene ether resins by melt-processing the resin with ethylenic unsaturated compounds containing a carboxylic acid group. Examples of such compounds include maleic anhydride, itaconic anhydride, glutonic anhydride, citraconic anhydride, tetrahydrophthalic anhydride, or the like, as well as the carboxylic acid, ester, amide and imide analogs thereof, i.e. maleic acid, itaconic acid, fumaric acid, dimethylmaleate, maleimide, tetrahydrophthalimide and the like. Maleic anhydride, itaconic acid and succinic anhydride are the only modifiers exemplified in the patent. It has been found that these compounds do not perform well in the modification of the polyphenylene ether resin compositions.

Of all the possible modifiers suggested in U.S. Pat. No. 4,654,405, we have found that the citraconimides are surprisingly superior to the others due to their ability to significantly improve the melt flow properties of the modified resin. Further, we have found that certain functional group-containing citraconimides can also be used to functionalize the resin in addition to improving the melt-flow properties.

WO 87/00540 discloses the use of functionalized maleimides for the functionalization of polyphenylene ether resins. Reduction of the melt viscosity during the functionalization process is not suggested, nor is the use of the citraconimides of the present invention.

Finally, German patent application DE 35 40 119 describes the modification of polyphenylene ether resins with maleimide compounds. Although the broad formula encompasses citraconimide compounds, they are not specifically disclosed or exemplified. Further, it is stated that polyphenylene ether resins, without polystyrene, are crosslinked in the presence of maleimide compounds, resulting in an increase of the melt viscosity. Accordingly, this patent application teaches away from the present invention.

Citraconimides are known compounds and can be prepared by any of the methods disclosed in the following publications: Mehta, N. B., et al., J. Org. Chem., Vol. 25, p. 1012 (1960), Paesschen, G. V. and Timmerman, D., Makromol. Chem., Vol. 27, p. 112 (1964) and Oishi, T., Polymer Journal, Vol. 12, No. 11, pp. 799–807 (1980), the disclosures of which are hereby incorporated by reference.

Suitable circumstances include, but are not limited to, citraconimide and substituted citraconimides such as N-(t-butyl) citraconimide, N-pentyl citronimide, N-(dodecyl) citraconimide, N-(octadecyl) citronimide, N-(3-chloropropyl) citraconimide, N-carboxymethyl citronimide, 2-citraconimido acetic acid, 2-citraconimido propionic acid, 2-citraconimido-3-methyl butanoic acid, N-5-carboxypentyl citraconimide, 2-citraconimido succinic acid, N-(2,3-dihydroxypropyl) citraconimide, 2-citraconimido-1,2-propanediol, N-t-butyltriol citraconimide, N-2-hydroxy ethyl citraconimide, N-(allyl) citraconimide, N-(oleyl)citraconimide, N-(furfuryl) citraconimide, 1-citraconimido-2-phenyl propane, N-(phenyl) citraconimide, N-benzyl citraconimide, 2-citraconimido-4-methyl-phenol, N-(4-bromophenyl) citraconimide, 4-citraconimido acetyl benzene, N-4-carboxyphenyl citraconimide, 4-citraconimido nitrobenzene, 4-citraconimido phenol, 2-citraconimido isopropenyl benzene, 2-citraconimido-1-methylethyl benzene, 2-citraconimido-glutaric acid, N-ethoxybcarbonyl amino citraconimide, N-(4-phenyl amino phenyl) citraconimide, N-diphenylmethylcitraconimide, N-diphenylpropylcitraconimide, and combinations thereof. It is also possible to form the citraconimide in situ by adding the precursors for the citraconimide compounds to the polyphenylene ether resin composition. For example, citraconic anhydride and t-butylamine or N-(t-butyl) citraconic acid amide instead of N-(t-butyl) citraconimide.

Preferably, the citraconimide compound is selected from the group wherein X is a $C_6$–$C_{18}$ aryl, a $C_7$–$C_{30}$ aralkyl, or a $C_7$–$C_{30}$ alkaryl group. More preferably, the citraconimide compound is N-benzyl citraconimide or N-phenyl citraconimide.

In another embodiment of this invention, X may be a $C_2$–$C_{18}$ alkenyl group. Preferably, the citraconimide compound is N-allyl citraconimide. The use of an N-alkenyl citraconimide compound results in the improvement of the melt-flow properties of the polyphenylene ether resin composition and the resultant modified resin comprises unsaturated groups derived from the N-alkenyl group in the citraconimide compound. Accordingly, this modified polyphenylene ether resin composition may be crosslinked subsequent to modification, for example in the presence of a free radical initiator.

The citraconimide compounds employed in the present invention are present in amounts of from 0.1 to 20 wt %, preferably 0.5 to 5.0 wt % based on the overall weight of the polymer components in the composition.

The conditions for the modification process of the present invention are, for the most part, conventional and are known in the art. The invention lies in the choice of citraconimide compounds as modifier resulting in the improvement in the melt-flow properties and in the functionalization of polyphenylene ether resin compositions. The conditions may be as follows.

The polyphenylene ether resin composition and the citraconimide compound may be combined and melt-processed in conventional melt compounding equipment such as a compounding extruder or the like. Although it is possible to melt-mix the phenylene ether resin composition and then add the citraconimide compound thereto, such as in an injection moulding process, the most practical and convenient processing method will be to dry-blend the components thoroughly as to obtain well-mixed and complete dispersion of the components and then melt-mixing the dry blend by passing through an extruder and cooling the extrudate and cutting into pellets or tablets. The dry-blending may be carried out from room temperature to temperatures below the melting point of the polyphenylene ether resin composition. The extrusion temperature is in the range of between the melting point and the degradation point of the resin composition, preferably between 170° to 350° C., more preferably 240° to 300° C. The application of a high shearing process together with external heating achieves a thorough mixing of the components, melting of the polymer components and provides the conditions necessary to achieve the interaction of the citraconimide compounds with the resin composition.

Polyphenylene ether resins are high melt temperature materials and are difficult to melt-mix thoroughly. High shear mixing devices such as, for example, single or twin screw compounding extruders are therefore generally preferred for successful melt-processing. Such devices, and particularly, twin-screw compounding extruders can rapidly process polyphenylene ether resins with high shear and thorough mixing, permitting a short residence time. The use of heated roll mills, Banbury mixers and the like, for compounding these resin compositions are also possible, but may require extended mixing times. This could result in the crosslinking, gelling, and/or oxidizing of the polyphenylene ether resin composition. Hence, these devices may be employed for the purpose of the invention when care is used to avoid such detrimental results.

Polyphenylene ether resins are known compounds and are described, for example, in U.S. Pat. Nos. 3,306,874, 3,306,875, 3,257,357, and 3,257,358. Polyphenylene ether resins are to be understood to include homopolymers and/or copolymers. Polyphenylene ether resins may be for example poly(2,6-dimethyl-1,4-phenylene ether), poly(2-methyl-6-ethyl-1,4-phenylene ether), poly(2-methyl -6-propyl -1,4-phenylene ether), poly(2,6-dipropyl-1,4-phenylene ether), poly(2-ethyl-6-propyl-1,4-phenylene ether), or copolymers thereof, for example with 2,3,6-trimethylphenol.

The polyphenylene ether resin compositions according to the invention may also comprise styrenic materials such as polystyrene or rubber-modified polystyrene. Other suitable styrenic materials are polymers derived from substituted styrene compounds and styrenic copolymers, for example, styrene-acrylonitrile copolymers, styrene-butadiene copolymers, and styrene-acrylonitrile-butadiene terpolymers. The polyphenylene ether resin may be combined with the styrenic materials in any ratio. The ratio of polyphenylene ether resin to styrenic materials is preferably between 1:20 and 20:1, and more particularly between 1:5 and 10:1.

The polyphenylene ether resin composition may also comprise polyamide. The polyamides may include nylon resins, including both aliphatic polylactams, such as polycaprolactam (Nylon-6) and higher analogues such as Nylon-11 and Nylon-12, and polyamides formed from aliphatic diamines and aliphatic dicarboxylic acids such as polyhexamethylene sebacamide (Nylon-6,10), polyhexamethylene adipamide (Nylon-6,6) and the like. Further examples of useful polyamides include the amorphous as well as the crystalline versions, the toughened polyamides and the aromatic-aliphatic copolymers, terpolymers and tetrapolymers. In this case, the polyphenylene ether resin employed is modified beforehand according to processes known in the art by, for example, maleic anhydride. This modification makes the resin compatible with polyamide. However, this modification does not result in the improvement of the melt-flow properties of the polyphenylene ether resin or of the composition. As the present comparative examples will show, the modification of polyphenylene ether resin with maleic anhydride results in the increase of the viscosity, meaning a worsening of the melt-flow properties.

In addition to the constituents mentioned hereinbefore, the polyphenylene ether resin composition may also comprise auxiliary substances which are known to be useful in combination with said resin, for example, substances to improve the impact strength, e.g. block copolymers, and substances to give the polyphenylene ether resin flame-retarding properties and fillers, including glass fibers, antistatics, pigments, etc.

The invention will be further illustrated by the following examples which are not to be construed as limiting the invention in any way. The scope of the invention is to be determined from the claims appended hereto.

EXAMPLES

Materials Materials are specified in parts per hundred based on the polyphenylene ether resin (phr).
Polyphenylene ether resin:
  PPE=Poly (2,6-dimethyl-1,4-phenylene ether) (PPE 800, ex. General Electric Plastics)
Modifiers:
  NPCI=N-Phenylcitraconimide
  NBCI=N-Benzylcitraconimide
  MCI-OD=N-Octadecyl citraconimide
  MCI-A=N-Allyl citraconimide
  MCI-DP=N-(2,3-Dihydroxypropyl) citraconimide
  MCI-CM=N-Carboxymethyl citraconimide
  MCI-CP=N-5-Carboxypentyl citraconimide MCI-CPh=N-4-Carboxyphenyl citraconimide
MCI-GA=2-Citraconimido glutaric acid
MCI-DPA=N-(4-phenyl amino phenyl) citraconimide
MCI-DPhM=N-diphenylmethylcitraconimide
MCI-DPP=N-diphenylpropylcitraconimide
MCI-D=N-dodecylcitraconimide
NPMI=N-Phenylmaleimide
NBMI=N-Benzylmaleimide
DBM Dibutyl maleate
MAH=Maleic anhydride
MAIC=N-Octadecyl maleic acid amide
Initiator:
Px 30=2,3-dimethyl -2,3-diphenylbutane (Perkadox® 30, ex. Akzo Chemicals)

Compounding of PPE compositions

Except if otherwise stated PPE was dry-blended with the modifying compound 5 to 15 minutes at room temperature to ensure a well homogenization of the composition.

Modification of PPE compositions

The modification of PPE compositions with the various modifiers was carried out with the Haake Rheocord System 40 fitted with Rheomix 600 mixing chamber containing roller sensors. The reaction time was 15 minutes at 30 rpm and 290° C. The end-torque is measured after 15 minutes.

Examples 1–6 and Comparative Examples A–D

PPE was modified with maleimide compounds according to the prior art and with citraconimide compounds according to the invention. As is shown from the results in Table 1, the use of the citraconimide compounds results in a greater reduction of the end-torque and thus an improvement of the melt-flow properties of PPE in comparison with the use of maleimide compounds.

TABLE 1

| Ex. No. | Composition | Concentration Modifier (phr) | Melt viscosity End torque (Nm) | Reduction (%) |
|---|---|---|---|---|
| control | PPE | — | 13.03 | 0 |
| A | PPE + NPMI | 0.43 | 12.33 | 5.4 |
| 1 | PPE + NPCI | 0.42 | 10.34 | 20.6 |
| 2 | PPE + NBCI | 0.50 | 10.63 | 18.4 |
| B | PPE + NPMI | 1.30 | 10.65 | 18.3 |
| C | PPE + NBMI | 1.40 | 9.30 | 32.1 |
| 3 | PPE + NPCI | 1.40 | 6.26 | 52.0 |
| 4 | PPE + NBCI | 1.51 | 6.35 | 51.3 |
| D | PPE + NPMI | 2.50 | 5.47 | 58.0 |
| 5 | PPE + NPCI | 2.50 | 3.68 | 71.8 |
| 6 | PPE + NBCI | 2.81 | 4.07 | 68.8 |

Comparative Examples E–I

The modification of PPE with N-phenyl citraconimide (NPCI) was compared with the modification of PPE with other modifiers of the prior art, i.e. dibutyl maleate (DBM) and maleic anhydride (MAH). As the results show in Table 2, the modification of PPE with dibutyl maleate results in a lower decrease of end-torque than the modification of PPE with citraconimide. The use of maleic anhydride results in an increase of the end-torque, meaning an increase of viscosity, (i.e. a worsening of the melt-flow properties of PPE).

TABLE 2

| Ex. No. | Composition | Concentration Modifier (phr) | Melt viscosity End torque (Nm) | Reduction (%) |
|---|---|---|---|---|
| control | PPE | — | 13.03 | 0 |
| 1 | PPE + NPCI | 0.42 | 10.34 | 20.6 |
| E | PPE + DBM | 0.51 | 11.12 | 14.7 |
| F | PPE + MAH | 0.74 | 14.82 | INCREASE |
| 3 | PPE + NPCI | 1.40 | 6.26 | 52.0 |
| G | PPE + DBM | 1.53 | 8.26 | 36.6 |
| H | PPE + MAH | 1.37 | 14.01 | INCREASE |
| 5 | PPE + NPCI | 2.50 | 3.68 | 71.8 |
| I | PPE + DBM | 2.86 | 5.95 | 54.3 |

Examples 7–9

PPE was modified by adding functionalized citraconimide compounds to PPE. The results in Table 3 show that the end-torque is reduced significantly by modification with functionalized citraconimide compounds. These functionalized citraconimide compounds also provide the further advantage that they introduce functional groups into the modified PPE.

TABLE 3

| Ex. No. | Composition | Conc. Modifier (phr) | Melt viscosity End torque (Nm) | Reduction (%) | Funct. |
|---|---|---|---|---|---|
| control | PPE | — | 13.03 | 0 | — |
| 7 | PPE + MCI-DP | 1.39 | 8.04 | 38.3 | hydroxyl |
| 8 | PPE + MCI-DP | 2.59 | 7.75 | 40.5 | hydroxyl |
| 9 | PPE + MCI-CM | 1.37 | 11.71 | 10.1 | acid |

Example 10 and Comparative Example J

PPE was modified with N-allyl citraconimide (Example 10a) and subsequently crosslinked with P×30 as initiator (Example 10b). The results in Table 4 show that P×30 alone in PPE has no influence at all on a possible increase in the melt viscosity of the PPE (Comparative Example J). However, the use of N-allyl citraconimide in the modification of PPE results in a significant decrease of the melt viscosity. Subsequently, the addition of P×30 shows an increase of the melt-viscosity, signifying that the allyl groups of the citraconimide compounds which were grafted onto the PPE are being crosslinked by P×30.

TABLE 4

| Ex. No. | Composition | Conc. Px3O/MCI-A (phr) | Melt viscosity End torque (Nm) | Reduction (%) |
| --- | --- | --- | --- | --- |
| control | PPE | — | 13.03 | 0 |
| J | PPE + Px3O | 2.38 | 11.44 | 12.2 |
| 10a | PPE + MCI-A | 2.11 | 7.84 | 39.8 |
| 10b | PPE + Px3O | 2.38 | 30.59 | X |

X = crosslinked

Examples 11–12

A blend of PPE and polystyrene (PS) (1:1) and a blend of PPE and polyamide (PA) (Noryl® GTX, ex. General Electric Plastics) were modified with N-phenyl citraconimide according to the invention. As is shown from the results in Table 5, the use of the citraconimide compound in a blend comprising PPE results in a reduction of the end-torque, and thus an improvement of the melt-flow properties of the PPE compositions.

TABLE 5

| Ex. No. | Composition | Concentration Modifier (phr) | Melt viscosity End torque (Nm) | Reduction (%) |
| --- | --- | --- | --- | --- |
| control 1 | PPE/PS | — | 3.42 | 0 |
| 11 | PPE/PS + NPCI | 2.50 | 2.04 | 40.4 |
| control 2 | Noryl GTX | — | 1.91 | 0 |
| 12 | Noryl GTX + NPCI | 2.50 | 0.90 | 52.9 |

Examples 13–16 and Comparative Example K

PPE was modified with citraconimide compounds, functionalized citraconimide compounds and a modifier compound from the prior art. The results in Table 6 show that the end-torque is reduced significantly by modification with citraconimide compounds, either functionalized or not, in comparison with the use of the modifier compound of the prior art. It is also shown that functionalized citraconimide compounds provide the further advantage that they introduce functional groups into the modified PPE.

TABLE 6

| Ex. No. | Composition | Conc. Modifier (phr) | Melt viscosity End torque (Nm) | Reduction (%) | Funct. |
| --- | --- | --- | --- | --- | --- |
| control | PPE | — | 12.23 | 0 | — |
| 13 | PPE + MCI-CPh | 2.50 | 5.46 | 55.0 | acid |
| 14 | PPE + MCI-CP | 2.50 | 6.17 | 49.6 | acid |
| 15 | PPE + MCI-GA | 3.36 | 9.3 * | 24.0 | acid |
| 16 | PPE + MCI-0D | 2.50 | 5.37 | 56.1 | — |
| K | PPE + MAIC | 2.50 | 10.65 | 12.9 | acid |

* = Torque measured at 5 minutes

Examples 17–20

PPE was modified with citraconimide compounds and functionalized citraconimide compounds. The results in Table 7 show that the end-torque is reduced significantly by modification with citraconimide compounds, either functionalized or not. It is also shown that functionalized citraconimide compounds provide the further advantage that they introduce functional groups into the modified PPE.

TABLE 7

| Ex. No. | Composition | Conc. Mod. (phr) | Melt viscosity End torque (Nm) | Reduction (%) | Funct. |
| --- | --- | --- | --- | --- | --- |
| control | PPE | — | 13.03 | 0 | — |
| 17 | PPE + MCI-D | 1.51 | 6.7 | 48.6 | — |
| 18 | PPE + MCI-DPhM | 1.51 | 8.3 | 36.3 | — |
| 19 | PPE + MCI-DPP | 1.51 | 7.3 | 44.0 | — |
| 20 | PPE + MCI-DPA | 3.89 | 4.3 | 67.0 | phenyl-amine |

Examples 21-22

PPE was dry-blended with citraconimide compounds during 1 hour at 160° C. under air before modification. The results in Table 8 show that the end-torque is reduced significantly by modification with citraconimide compounds in comparison with the control.

TABLE 8

| | | Conc. | Melt viscosity | |
|---|---|---|---|---|
| Ex. No. | Composition | Modifier (phr) | End torque (Nm) | Reduction (%) |
| control | PPE | — | 13.8 | 0 |
| 1 | PPE + NPCI | 1.4 | 6.2 | 55 |
| 2 | PPE + NBCI | 1.51 | 7.2 | 48 |

We claim:

1. A process for the modification of a polyphenylene ether resin composition, which comprises reacting the polyphenylene ether resin composition at a temperature above the melting point and below the degradation point of said resin composition with an effective amount of a citraconimide compound to significantly reduce the melt viscosity of said resin composition, said citraconimide compound being represented by the formula (I):

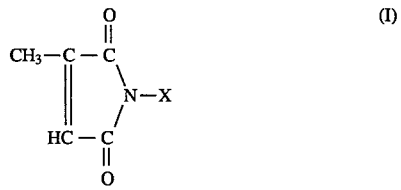

wherein X is selected from the group consisting of hydrogen, $C_1$–$C_{18}$ alkyl groups, $C_2$–$C_{18}$ alkenyl groups, $C_2$–$C_{18}$ alkynyl groups, $C_3$–$C_{18}$ cycloalkyl groups, $C_3$–$C_{18}$ cycloalkenyl groups, $C_3$–$C_{18}$ cycloalkynyl groups, $C_6$–$C_{18}$ aryl groups, $C_7$–$C_{30}$ aralkyl groups, $C_7$–$C_{30}$ alkaryl groups, and $C_7$–$C_{30}$ alkenaryl groups, all of which may be linear or branched and unsubstituted or substituted with one or more amino, carboxy, cyano, halogens, esters, oxiranes, ethers, nitro, hydroxy and alkoxy groups.

2. The process of claim 1, wherein X is a $C_6$–$C_{18}$ aryl, a $C_7$–$C_{30}$ aralkyl, or a $C_7$–$C_{30}$ alkaryl group.

3. The process of claim 1, wherein X is a $C_2$–$C_{18}$ alkenyl group.

4. The process of claim 1, wherein the polyphenylene ether resin composition further comprises styrenic materials in a ratio of 1:20 to 20:1.

5. The process of claim 1, wherein the polyphenylene ether resin composition further comprises polyamide.

6. The process of claim 1, wherein said citraconimide compound is present in an amount from 0.1 to 20 wt %, based on the overall weight of the polymer compounds in the composition.

7. Modified polyphenylene ether resin composition produced by the process of claim 1.

8. A shaped object comprising at least one modified polyphenylene ether resin composition according to claim 7.

* * * * *